(12) United States Patent
Martinez

(10) Patent No.: US 12,536,375 B2
(45) Date of Patent: Jan. 27, 2026

(54) COMPUTER-READABLE RECORDING MEDIUM STORING COMPUTER PROGRAM, MACHINE LEARNING METHOD, AND NATURAL LANGUAGE PROCESSING APPARATUS

(71) Applicant: FUJITSU LIMITED, Kawasaki (JP)

(72) Inventor: Ander Martinez, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 325 days.

(21) Appl. No.: 18/317,273

(22) Filed: May 15, 2023

(65) Prior Publication Data

US 2023/0281392 A1 Sep. 7, 2023

Related U.S. Application Data

(63) Continuation of application No. PCT/JP2020/043463, filed on Nov. 20, 2020.

(51) Int. Cl.
*G06F 40/295* (2020.01)
*G06N 20/00* (2019.01)
*G06F 40/30* (2020.01)

(52) U.S. Cl.
CPC .......... *G06F 40/295* (2020.01); *G06N 20/00* (2019.01); *G06F 40/30* (2020.01)

(58) Field of Classification Search
None
See application file for complete search history.

(56) References Cited

U.S. PATENT DOCUMENTS

| | | | |
|---|---|---|---|
| 2008/0004863 | A1 | 1/2008 | Moore et al. |
| 2012/0232904 | A1* | 9/2012 | Zhu .......................... G10L 15/22 704/E15.005 |
| 2015/0100524 | A1 | 4/2015 | Pantel et al. |
| 2017/0213157 | A1* | 7/2017 | Bugay ..................... G06F 40/30 |

(Continued)

FOREIGN PATENT DOCUMENTS

| | | |
|---|---|---|
| JP | 2013-196478 A | 9/2013 |
| WO | 2015/053993 A1 | 4/2015 |
| WO | 2020/174826 A1 | 9/2020 |

OTHER PUBLICATIONS

Toshihiro Oda et al., "Named Entity Extraction Method Combined with Machine-Learning Using Support Vector Machine and Pattern for Type Classification", Proceedings of the 74th National Convention of IPSJ, Mar. 6, 2012, pp. 2-37 to 2-38 (Total 4 pages) (Cited in ISR).

(Continued)

*Primary Examiner* — Nafiz E Hoque
(74) *Attorney, Agent, or Firm* — Fujitsu Intellectual Property Center

(57) ABSTRACT

A computer acquires training data including first text, first class information indicating a class mapped to a single word contained in the first text, first position information indicating a position of the single word in the first text, and first range information indicating a range of a first named entity that includes the single word in the first text. The computer executes, based on the training data, machine learning of a machine learning model which is used to estimate, from text, class information, and position information, range information of a named entity included in the text.

6 Claims, 12 Drawing Sheets

(56) References Cited

U.S. PATENT DOCUMENTS

2022/0043972 A1   2/2022   Nishida et al.

OTHER PUBLICATIONS

Ryuya Ikeda et al., "Extraction of Food Product and Shop Names from Blog Text Using Named Entity Recognition", IPSJ SIG Technical Report (NL), 2019-NL-243, pp. 1-8, Nov. 27, 2019 (Total 9 pages) (Cited in ISR).
International Search Report and Written Opinion of the International Searching Authority (Form PCT/ISA/210, 220, and 237), mailed in connection with PCT/JP2020/043463 and mailed Jan. 12, 2021 (Total 3 pages).

* cited by examiner

COMPUTER-READABLE RECORDING MEDIUM STORING COMPUTER PROGRAM, MACHINE LEARNING METHOD, AND NATURAL LANGUAGE PROCESSING APPARATUS

CROSS-REFERENCE TO RELATED APPLICATION

This application is a continuation application of International Application PCT/JP2020/043463 filed on Nov. 20, 2020, which designated the U.S., the entire contents of which are incorporated herein by reference.

FIELD

The embodiments discussed herein relate to a machine learning method and natural language processing apparatus.

BACKGROUND

Text written in natural language includes multiple words. Such words are sometimes called tokens. Two or more words amongst multiple words contained in text may form one named entity (NE). Named entities are linguistic expressions that represent particular entities, and include proper nouns, such as personal names, organization names, place names, and product names.

Some computer natural language processing tasks include a subtask of recognizing, amongst a string of words contained in text, the range of words that form one named entity. The range of a named entity is sometimes called a span. For example, named entity recognition (NER) for recognizing the types of named entities contained in text includes a subtask of recognizing the range of each named entity. Note that named entity recognition is sometimes referred to as named entity extraction. Relation extraction for extracting relationships between multiple named entities from text includes a subtask of recognizing the range of each named entity. Semantic role labeling for recognizing dependency relations between predicates and named entities includes a subtask of recognizing the range of each named entity.

There is a proposed phrase extraction method for extracting phrase pairs between a source sentence and a translated sentence. The proposed phrase extraction method selects a phrase in the source sentence, and estimates boundaries for a phrase in the translated sentence based on comparison between words in the translated sentence and words in the source phrase.

In addition, a language processing apparatus has been proposed that retrieves, from a terminology dictionary, terminology information corresponding to an input character string. The proposed language processing apparatus selects a range of the character string, normalizes each word included in the selected range, and concatenates the normalized words. The language processing apparatus calculates a hash value of the normalized character string and reads terminology information mapped to the hash value from the terminology dictionary.

In addition, there is a proposed response generating apparatus for generating a response to a question sentence. The proposed response generating apparatus converts words included in the question sentence and words included in a prepared sentence into vector representation using a machine learning model. The response generating apparatus uses the vector representation to calculate, for each range of the words in the prepared sentence, a score indicating the degree of match with the question sentence.

See, for example, U.S. Patent Application Publication No. 2008/0004863, Japanese Laid-open Patent Publication No. 2013-196478, and International Publication Pamphlet No. WO2020/174826.

SUMMARY

According to an aspect, there is provided a non-transitory computer-readable recording medium storing therein a computer program that causes a computer to execute a process including acquiring training data that includes first text, first class information indicating a class mapped to a single word contained in the first text, first position information indicating a position of the single word in the first text, and first range information indicating a range of a first named entity that includes the single word in the first text; and executing, based on the training data, machine learning of a machine learning model used to estimate, from text, class information, and position information, range information of a named entity contained in the text.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Natural language processing tasks may utilize machine learning models generated from training data through machine learning. Such machine learning models are, for example, neural networks. Conventionally, natural language processing tasks that include recognition of the range of each named entity as a subtask often make use of a machine learning model for named entity recognition.

However, machine learning models for named entity recognition integrally execute recognition of the ranges of named entities and recognition of the types of the named entities together, without separating them. In some cases, such machine learning models for named entity recognition fail to provide sufficiently high accuracy in recognizing the ranges of named entities. As a result, noise contained in the recognition results of the ranges of named entities may reduce the accuracy of a main task.

Figure 1:
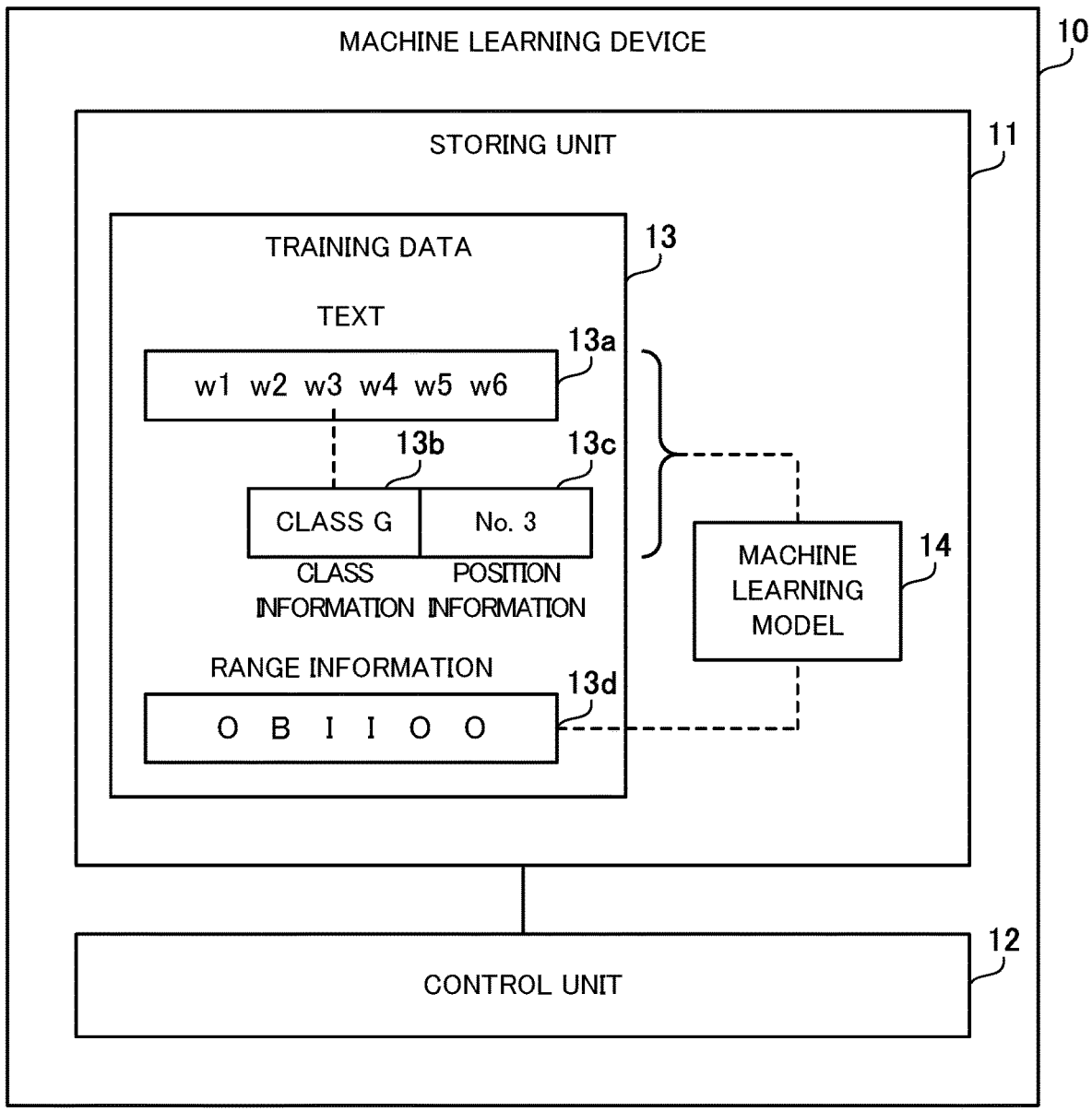
FIG. 1 illustrates a machine learning device according to a first embodiment.

Several embodiments will be described below with reference to the accompanying drawings. First, a first embodiment is described. FIG. 1 illustrates a machine learning device according to the first embodiment. Using machine learning, a machine learning device 10 of the first embodiment generates a machine learning model for recognizing a range that forms one named entity amongst a string of words contained in text. The range of a named entity recognized by a machine learning model is sometimes called a span. Recognition of a span is sometimes called span query or span selection. A machine learning model for span recognition is sometimes called a span query model (SQM). The machine learning device 10 may be a client device or a server device. The machine learning device 10 may be called a computer, an information processor, or a natural language processor.

The machine learning device 10 includes a storing unit 11 and a control unit 12. The storing unit 11 may be volatile semiconductor memory such as random access memory (RAM), or a non-volatile storage device such as a hard disk drive (HDD) or flash memory. The control unit 12 is, for example, a processor such as a central processing unit (CPU), graphics processing unit (GPU), or digital signal processor (DSP). The control unit 12 may include an electronic circuit designed for specific use, such as an application specific integrated circuit (ASIC) or field programmable gate array (FPGA). The processor executes programs stored in memory such as RAM (or in the storing unit 11). The term "multiprocessor", or simply "processor", may be used to refer to a set of multiple processors.

The storing unit 11 stores training data 13. The training data 13 may be generated by the control unit 12. The training data 13 includes text 13a, class information 13b, position information 13c, and range information 13d. The text 13a, the class information 13b, and the position information 13c are input data corresponding to explanatory variables of a machine learning model 14. The range information 13d is teacher data corresponding to a target variable of the machine learning model 14.

The text 13a is a document written in natural language. The text 13a includes a character string. The character string is split into words. Such words are sometimes referred to as tokens. For example, the text 13a includes words w1, w2, w3, w4, w5, and w6.

The class information 13b indicates a class mapped to one word contained in the text 13a. For example, the class information 13b indicates a class mapped to the word w3. The class indicated by the class information 13b may be a class to be determined by a different machine learning model. For example, the class may be the type of named entity recognized by a named entity recognition model, the type of relationship recognized by a relation extraction model, or the type of role recognized by a semantic role labeling model.

The position information 13c indicates the position of the word corresponding to the class information 13b, in the text 13a. The position information 13c may be a position number indicating the position of the word of interest from the beginning of the text 13a. For example, the position information 13c indicates that the word of interest is the third word in the text 13a.

The range information 13d indicates the range of a named entity including the word indicated by the position information 13c, in the text 13a. Named entities are linguistic expressions that represent particular entities, and include proper nouns, such as personal names, organization names, place names, and product names. The range of a named entity may be called a span. Two or more of the words contained in the text 13a may form one named entity. In this case, the range of the named entity indicates the two or more words. Such two or more words included in one named entity may appear discontinuously in the text 13a.

The range information 13d may represent the range of a named entity in BIO format. The range information 13d in BIO format is a symbol string in which "B", "I" or "O" is assigned to each word contained in the text 13a. "B" (beginning) indicates that its corresponding word is the first word included in the named entity. "I" (inside) indicates that its corresponding word is the second or subsequent word included in the named entity. "O" (outside) indicates that its corresponding word is not included in the named entity. Assume here that the range information 13d is a symbol string "OBIIOO". The range information 13d indicates that the words w2, w3, and w4 form one named entity. Note that the training data 13 may include multiple sets of the class information 13b, the position information 13c, and the range information 13d.

The control unit 12 acquires the training data 13. The control unit 12 may generate the training data 13 from the text 13a. Alternatively, the control unit 12 may generate the training data 13 by converting training data for a different machine learning model that outputs the class information 13b. The control unit 12 executes machine learning of the machine learning model 14 based on the training data 13. The machine learning model 14 is, for example, a neural network. The neural network includes weights of internode edges as parameters whose values are determined through machine learning.

The machine learning model 14 receives input data including text, class information, and position information. Based on the input data, the machine learning model 14 estimates range information that represents the range of a named entity including a word indicated by the position information. For example, the machine learning model 14 converts each of multiple words contained in the text 13a into a word vector in distributed representation. The number of dimensions of the word vector is, for example, about several hundred dimensions, such as 300 dimensions. The machine learning model 14 also converts the class information into a class vector in distributed representation. The number of dimensions of the class vector is, for example, the same as that of the word vector. The machine learning model 14 concatenates the word vector of each word, the class vector, and the word vector of the word indicated by the position information. The machine learning model 14 converts the concatenated vector into range information.

In machine learning, the control unit 12 uses the text 13a, the class information 13b, and the position information 13c as input data and uses the range information 13d as teacher data. For example, the control unit 12 inputs the text 13a, the class information 13b, and the position information 13c to the machine learning model 14, and reads estimated range information from the machine learning model 14. The control unit 12 calculates the error between the range information 13d, which is teacher data, and the estimated range information, and updates parameter values included in the machine learning model 14 in such a manner as to reduce the error. For example, the control unit 12 updates the parameter values using error backpropagation.

Herewith, the control unit 12 generates the machine learning model 14 from the training data 13. The control unit 12 may store the machine learning model 14 in a non-volatile storage device; display information of the machine learning model 14 on a display device; and/or transmit the machine learning model 14 to a different information processor.

As described above, the machine learning device of the first embodiment acquires the training data 13 including the text 13*a*, the class information 13*b*, the position information 13*c*, and the range information 13*d*. Based on the training data 13, the machine learning device executes machine learning of the machine learning model 14, which is used to estimate range information of a named entity from text, class information, and position information. The use of the machine learning model 14 improves recognition accuracy for the range of a named entity.

It may be considered reasonable that an information processor uses a named entity recognition model to determine the range of each named entity before performing a main task of natural language processing. However, general named entity recognition models integrally execute recognition of a named entity class to be associated with each word and recognition of a range of words belonging to the same named entity. Such general named entity recognition models may fail to provide sufficiently high estimation accuracy for the range of each named entity. Therefore, the accuracy limit of general named entity recognition models may reduce accuracy of the main task.

In addition, named entity recognition models are often specialized for specific text fields in order to increase the accuracy of named entity class estimation. Text fields are sometimes called domains. Such domains include, for example, the medical field and the political economy field. Machine learning of a named entity recognition model for a particular domain uses text of the domain. Therefore, only a small amount of training data may be available for machine learning of the named entity recognition model, which may in turn lead to insufficient improvement in the accuracy of the named entity recognition model.

On the other hand, the machine learning model 14 generated by the machine learning device 10 performs recognition of the range of each named entity separately from a main task, such as named entity recognition, relation extraction, or semantic role labeling. Therefore, it is easy to improve recognition accuracy for the ranges of named entities. In addition, the machine learning model 14 allows for cooperation with machine learning models for different types of main tasks and different domains. Hence, the machine learning device 10 is able to generate the training data 13 from text of various domains to increase the size of the training data 13, which in turn improves the accuracy of the machine learning model 14.

In addition, machine learning models for main tasks (hereinafter simply called main task machine learning models) need not estimate the ranges of named entities and output information on the ranges of named entities during their main tasks. Further, main task machine learning models need not assume that the ranges of named entities have been accurately recognized. Therefore, it is easy to implement main task machine learning models and becomes easier to improve the accuracy of the main tasks. An information processor may connect the machine learning model to the back of a main task machine learning model. The information processor may input, to the machine learning model 14, class information output from the main task machine learning model. This allows the information processor to efficiently recognize the ranges of named entities.

Figure 2:
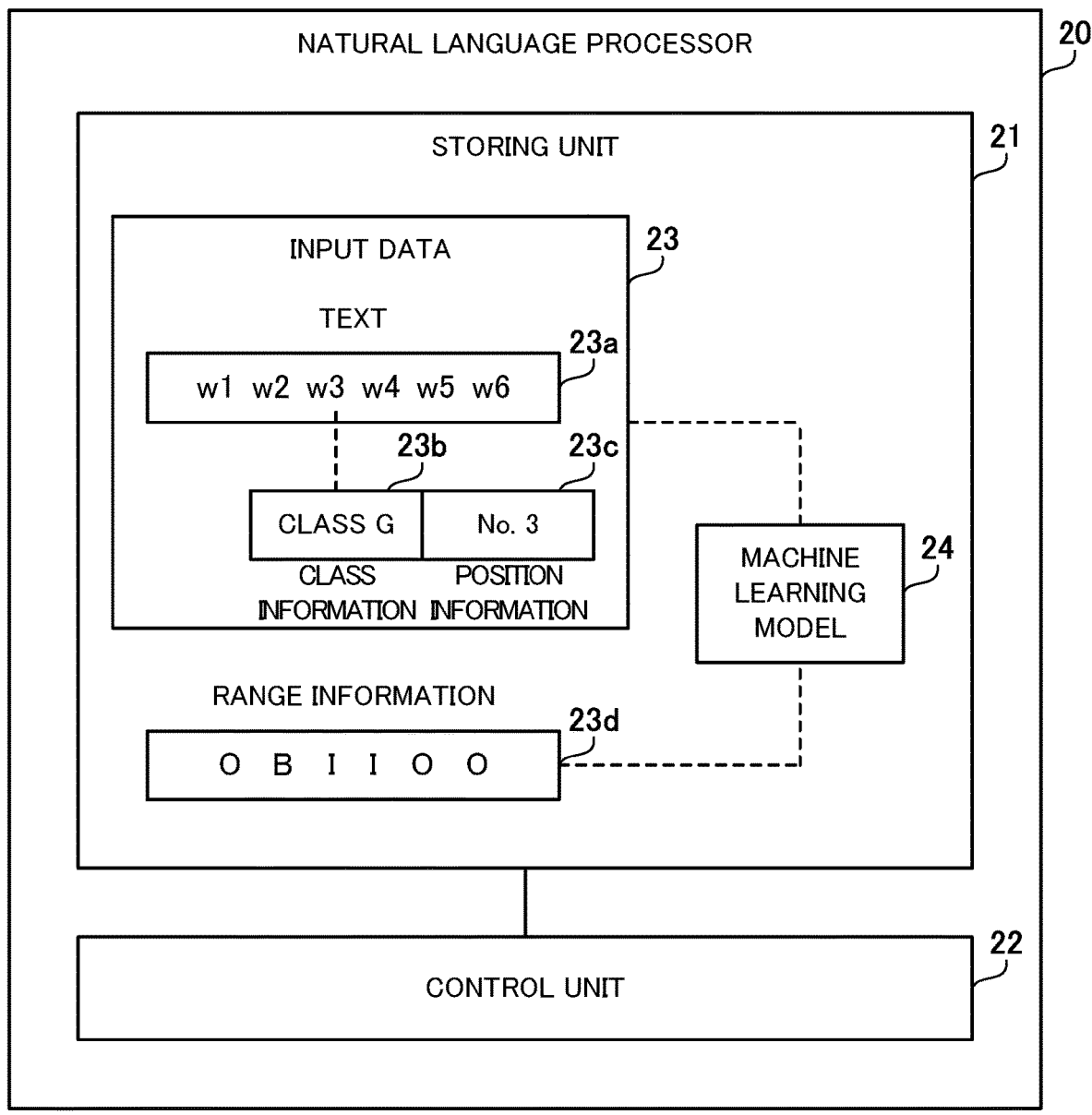
FIG. 2 illustrates a natural language processor of a second embodiment.
Figure 3:
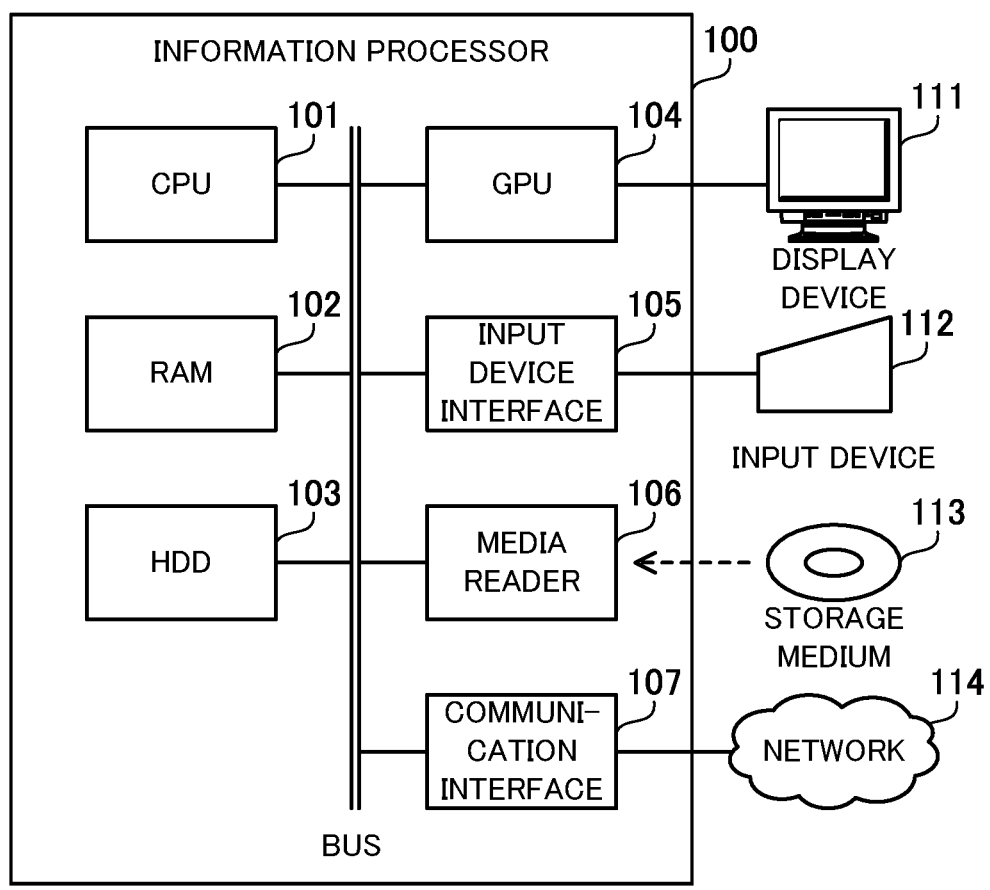
FIG. 3 illustrates an example of hardware of an information processor according to a third embodiment.

A second embodiment is described next. FIG. 2 illustrates a natural language processor of the second embodiment. Using a machine learning model, a natural language processor 20 of the second embodiment recognizes a range that forms one named entity amongst a string of words contained in text. The natural language processor 20 may be a client device or a server device. The natural language processor 20 may be the same as or different from the machine learning device 10 of the first embodiment. The natural language processor 20 may be called a computer or an information processor.

The natural language processor 20 includes a storing unit 21 and a control unit 22. The storing unit 21 may be volatile semiconductor memory such as RAM, or a non-volatile storage device such as an HDD or flash memory. The control unit 22 is, for example, a processor such as a CPU, GPU, or DSP. The control unit 22 may include an electronic circuit designed for specific use, such as an ASIC or FPGA. The processor executes programs stored in memory such as RAM.

The storing unit 21 stores therein text 23*a* and a machine learning model 24. The text 23*a* is a document written in natural language. The text 23*a* includes multiple words. The machine learning model 24 receives input data including text, class information, and position information. Based on the input data, the machine learning model 24 estimates range information that indicates the range of a named entity including a word indicated by the position information. The machine learning model 24 may be generated by a method similar to that of the machine learning device of the first embodiment. The machine learning model 24 may be the same as the machine learning model 14 of the first embodiment. The natural language processor 20 may externally receive the machine learning model 24.

The control unit 22 generates input data 23 including the text 23*a*, class information 23*b*, and position information 23*c*. The class information 23*b* indicates a class mapped to one word contained in the text 23*a*. The class information 23*b* may be an output of a main task machine learning model. For example, the class information 23*b* may indicate the type of named entity recognized by a named entity recognition model, the type of relationship recognized by a relation extraction model, or the type of role recognized by a semantic role labeling model. The position information 23*c* indicates the position of the word corresponding to the class information 23*b*, in the text 23*a*.

The control unit 22 inputs the input data 23 to the machine learning model 24 to generate range information 23*d*. The range information 23*d* is output from the machine learning model 24. The range information 23*d* indicates the range of a named entity including the word indicated by the position information 23*c*. The range information 23*d* is, for example, a symbol string representing the range of the named entity in BIO format.

The control unit 22 may store the range information 23*d* in a non-volatile storage device; display the range information 23*d* on a display device; and/or transmit the range information 23*d* to a different information processor. The control unit 22 may combine the range information 23*d* and an output of a main task machine learning model to generate results of natural language processing for the text 23*a*. The control unit 22 may store the combined results in a non-volatile storage device; display the combined results on a display device; and/or transmit the combined results to a different information processor.

As described above, the natural language processor 20 of the second embodiment generates the input data 23 including the text 23a, the class information 23b, and the position information 23c. The natural language processor 20 inputs the input data 23 to the machine learning model 24 and generates the range information 23d that indicates the range of a named entity. Herewith, recognition accuracy for the range of a named entity is improved.

A string of words forming one named entity may be discontinuous in the text 23a. In addition, one word contained in the text 23a may belong to two or more named entities. That is, two or more named entities may overlap in the text 23a. In other cases, two or more named entities may be nested. When a named entity recognition model is used to recognize the ranges of named entities, the structure of the named entity recognition model becomes complicated in order to output information of such complex named entities.

On the other hand, the machine learning model 24 outputs, for one word of interest, range information indicating the range of a named entity including the word. When a different word is specified, the machine learning model 24 outputs range information indicating the range of a named entity including the different word. Therefore, the natural language processor 20 is able to generate range information for complex named entities, such as a discontinuous named entity, multiple overlapping named entities, and multiple nested named entities. In addition, the machine learning model 24 has a simplified structure and provides improved accuracy.

A third embodiment will be described next. FIG. illustrates an example of hardware of an information processor of the third embodiment. An information processor of the third embodiment includes a CPU 101, a RAM 102, an HDD 103, a GPU 104, an input device interface 105, a media reader 106, and a communication interface 107.

The information processor 100 corresponds to the machine learning device 10 of the first embodiment and the natural language processor 20 of the second embodiment. The CPU 101 corresponds to the control unit 12 of the first embodiment and the control unit 22 of the second embodiment. The RAM 102 or the HDD 103 corresponds to the storing unit of the first embodiment and the storing unit 21 of the second embodiment.

The CPU 101 is a processor configured to execute program instructions. The CPU 101 reads out at least part of programs and data stored in the HDD 103, loads them into the RAM 102, and executes the loaded programs. Note that the information processor 100 may include two or more processors. The term "multiprocessor", or simply "processor", may be used to refer to a set of processors.

The RAM 102 is volatile semiconductor memory for temporarily storing therein programs to be executed by the CPU 101 and data to be used by the CPU 101 for its computation. The information processor 100 may be provided with a different type of volatile memory other than RAM.

The HDD 103 is a non-volatile storage device to store therein software programs, such as an operating system (OS), middleware, and application software, and various types of data. The information processor 100 may be provided with a different type of non-volatile storage device, such as flash memory or a solid state drive (SSD).

The GPU 104 produces video images in accordance with drawing commands from the CPU 101 and displays them on a screen of a display device 111 coupled to the information processor 100. The display device 111 may be a cathode ray tube (CRT) display, a liquid crystal display (LCD), an organic electro-luminescence (OEL) display, or a projector. An output device, such as a printer, other than the display device 111 may be connected to the information processor 100.

The input device interface 105 receives an input signal from an input device 112 connected to the information processor 100. Various types of input devices may be used as the input device 112, for example, a mouse, a touch panel, or a keyboard. Multiple types of input devices may be connected to the information processor 100.

The media reader 106 is a device for reading programs and data recorded on a storage medium 113. The storage medium 113 may be, for example, a magnetic disk, an optical disk, or semiconductor memory. Examples of the magnetic disk include a flexible disk (FD) and HDD. Examples of the optical disk include a compact disc (CD) and digital versatile disc (DVD). The media reader 106 copies the programs and data read out from the storage medium 113 to a different storage medium, for example, the RAM 102 or the HDD 103. The read programs may be executed by the CPU 101.

The storage medium 113 may be a portable storage medium and be used to distribute the programs and data. In addition, the storage medium 113 and the HDD 103 may be referred to as computer-readable storage media.

The communication interface 107 is connected to a network 114. The communication interface 107 communicates with different information processors via the network 114. The communication interface 107 may be a wired communication interface connected to a wired communication device, such as a switch or router, or may be a wireless communication interface connected to a wireless communication device, such as a base station or access point.

The information processor 100 performs natural language processing, such as named entity extraction, relation extraction, and semantic role labeling, on text written in natural language. The information processor 100 also generates a model used for the natural language processing through machine learning.

Figure 4:
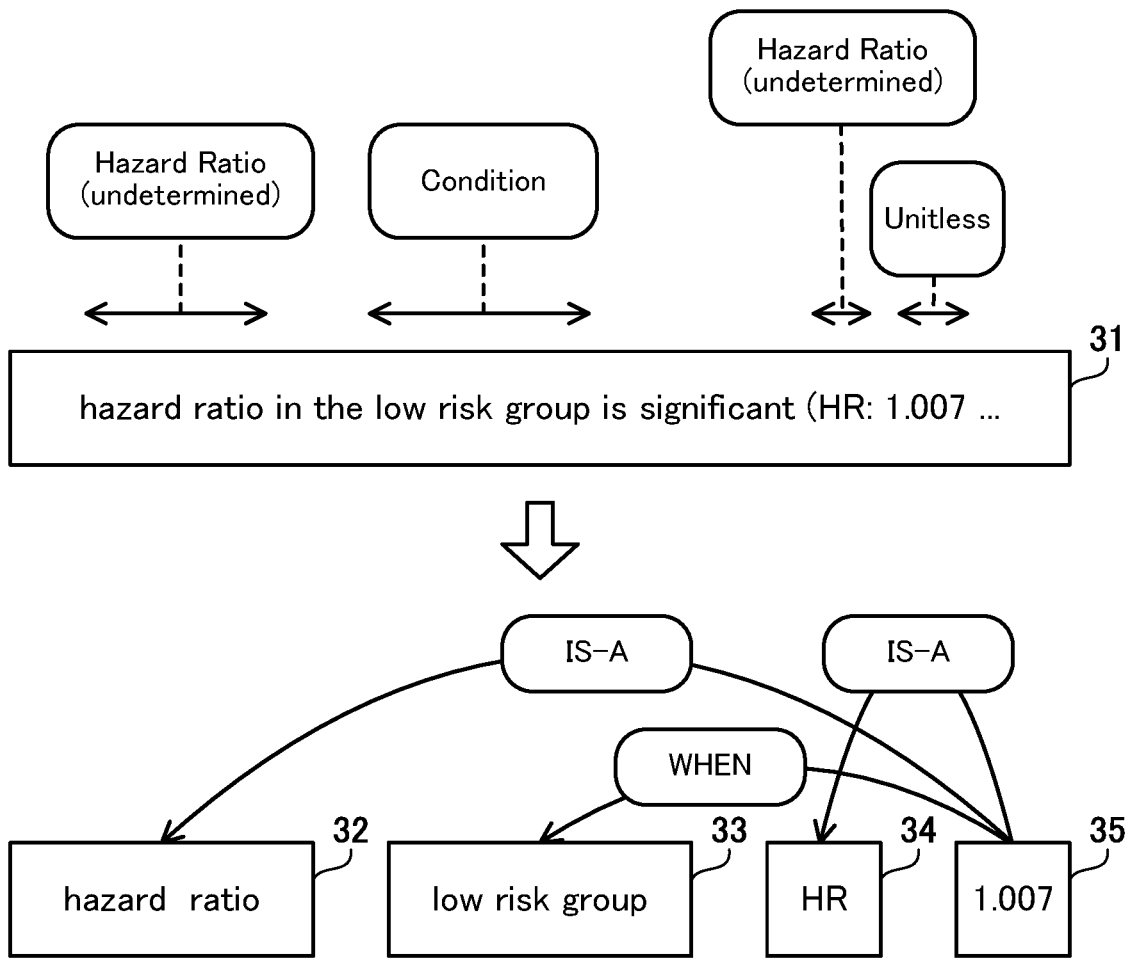
FIG. 4 illustrates a first example of relation extraction using named entity recognition.

FIG. 4 illustrates a first example of relation extraction using named entity recognition. As natural language processing, the information processor 100 may perform relation extraction for extracting relationships between multiple named entities. Such relation extraction includes, as a subtask, a span search for recognizing, amongst a string of words contained in text, spans of named entities which are possibly to be labeled. Span searches are sometimes called span queries or span selections. One conceivable method for implementing relation extraction is that the information processor 100 performs named entity recognition as preprocessing.

As an example, the information processor 100 performs named entity recognition on text 31 using a named entity recognition model. The named entity recognition model outputs labels that indicate the spans and classes of individual named entities contained in the text 31.

Herewith, named entities 32, 33, 34, and 35 are extracted from the text 31. The named entity 32 is "hazard ratio" and includes two words. A class of "Hazard Ratio (undetermined)" is assigned to the named entity 32. The named entity 33 is "low risk group" and includes three words. A class of "Condition" is assigned to the named entity 33. The named entity 34 is "HR" and includes one word. The same class as that of the named entity 32 is assigned to the named entity 34. The named entity 35 is "1.007" and includes one word. A class of "Unitless" is assigned to the named entity 35.

The information processor 100 performs relation extraction, which is a main task, by inputting the output of the named entity recognition model to a relation extraction model. The relation extraction model outputs labels each indicating the type of relationship between multiple named entities contained in the text 31. Herewith, it is extracted that the named entities 32 and 35 have a relationship of "IS-A". It is also extracted that the named entities 33 and 35 have a relationship of "WHEN". Further, it is extracted that the named entities 34 and 35 have a relationship of "IS-A".

The named entities 32, 33, 34, and 35 are a continuous word string in the text 31. However, a discontinuous string of words in text may form one named entity. The named entities 32, 33, 34, and 35 do not overlap in the text 31. However, multiple named entities may overlap because one word contained in text belongs to the multiple named entities. The named entities 32, 33, 34, and 35 are not nested. However, a given named entity may contain all words included in a different named entity, thus forming a nest of multiple named entities.

Figure 5:
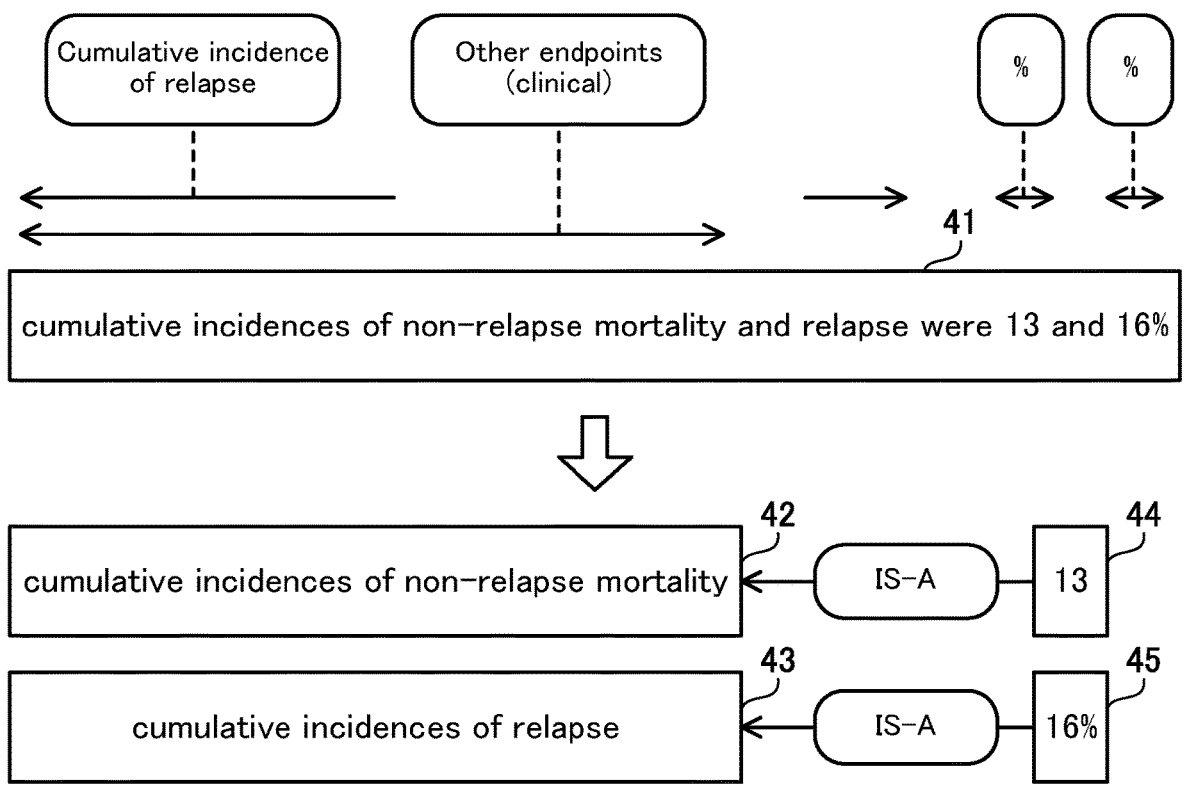
FIG. 5 illustrates a second example of relation extraction using named entity recognition.

FIG. 5 illustrates a second example of relation extraction using named entity recognition. Assume a case where the information processor 100 performs named entity recognition as preprocessing for relation extraction, as in FIG. 4. The information processor 100 performs named entity recognition on text 41.

Herewith, named entities 42, 43, 44, and 45 are extracted from the text 41. The named entity 42 is "cumulative incidences of non-relapse mortality" and includes five words. A class of "Other endpoints (clinical)" is assigned to the named entity 42. The named entity 43 is "cumulative incidences of relapse" and includes four words. A class of "Cumulative incidences of relapse" is assigned to the named entity 43. The named entity 44 is "13" and includes one word. The named entity 45 is "16%" and includes one word. A class of "%" is assigned to each of the named entities 44 and 45.

The information processor 100 performs relation extraction, which is a main task, using the results of the named entity recognition. Herewith, it is extracted that the named entities 42 and 44 have the relationship "IS-A" and the named entities 43 and 45 have the relationship "IS-A".

Note here that the named entities 42 and 43 include the common string of words "cumulative incidences of" and thus overlap. In addition, the named entity 43 straddles a word string of "non-relapse mortality and" and is thus discontinuous in the text 41. As seen in this example, complex named entities may be contained in text.

In the above example, the information processor first recognizes the spans of named entities, and then uses the recognition results to perform a main task, such as relation extraction. On the other hand, general named entity recognition models integrally perform class recognition and span recognition of named entities. Such general named entity recognition models may fail to provide sufficiently high estimation accuracy for the span of each named entity. Therefore, the estimation accuracy for the spans of named entities may reduce accuracy of the main task.

In addition, general named entity recognition models are often specialized for specific domains in order to increase the accuracy of estimating classes of named entities. Machine learning of a named entity recognition model for a particular domain uses text of the domain. Therefore, only a small amount of training data may be available for machine learning of the named entity recognition model, which may in turn lead to insufficient improvement in accuracy for span estimation by the named entity recognition model. In addition, the structure of the named entity recognition model becomes complicated in order for the model to output information on the above-mentioned complicated named entities.

In view of the above, the information processor of the third embodiment defines a versatile span search model for recognizing the span of each named entity, separately from a named entity recognition model and other main task models. Such a span search model may be called a span query model (SQM) or span selection model. The span search model is a neural network. The information processor generates the span search model through machine learning.

The span search model is connected to the back of main task models. The span search model uses class estimation results obtained by a main task model in addition to text, to subsequently determine the span of each named entity. The main task model does not have to accurately estimate the spans of named entities. The information processor 100 combines the output of the main task model and the output of the span search model to generate task results of natural language processing.

Figure 6:
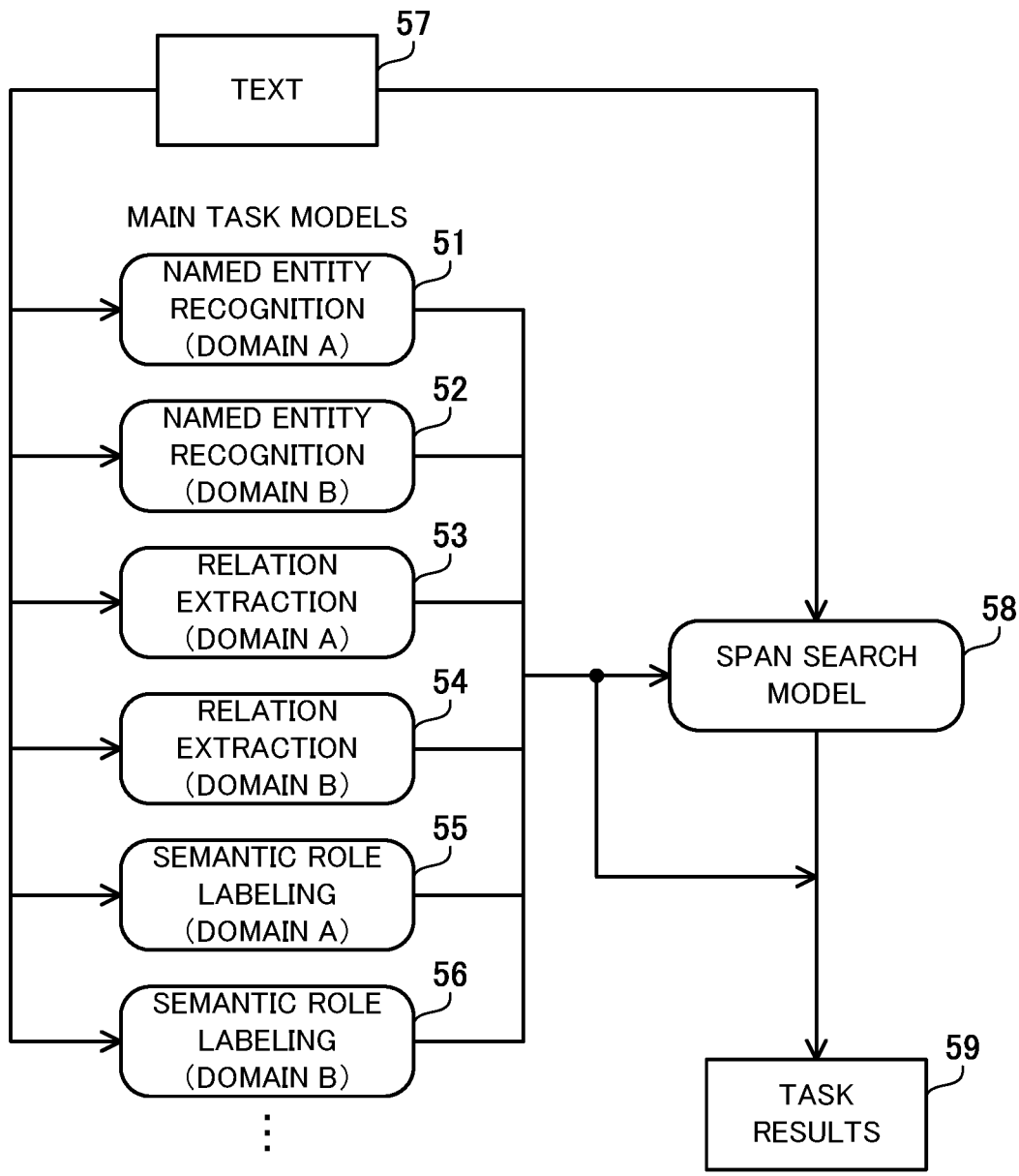
FIG. 6 illustrates a flow example of natural language processing using a span search model.

FIG. 6 illustrates a flow example of natural language processing using a span search model. The information processor 100 has multiple main task models, such as main task models 51, 52, 53, 54, 55, and 56 and a span search model 58. The main task models 51, 52, 53, 54, 55, and 56 are neural networks.

The main task model 51 is a named entity recognition model for a domain A. The main task model 52 is a named entity recognition model for a domain B. The main task model 53 is a relation extraction model for the domain A. The main task model 54 is a relation extraction model for the domain B. The main task model 55 is a semantic role labeling model for the domain A. The main task model 56 is a semantic role labeling model for the domain B. The span search model 58 is allowed to be combined with any of the main task models 51, 52, 53, 54, 55, and 56. That is, the span search model 58 may be combined with main task models for various purposes and domains.

In analyzing text 57, the information processor selects a main task model that fits the purpose of the analysis and the domain of the text 57, and inputs the text to the selected main task model. The selected main task model assigns classes to some or all of the words contained in the text 57 and outputs class information.

For example, a named entity recognition model assigns, to some words contained in the text 57, named entity classes each indicating the type of named entity. A relation extraction model assigns, to some words contained in the text 57, relation classes each indicating the type of relationship. A semantic role assignment model assigns, to some words contained in the text 57, role classes each indicating the type of dependency relation with its predicate.

At this time, such a main task model may omit output of span information that indicates the spans of named entities. Even if the final task goal is to recognize a class for each named entity, the main task model may assign a class to at least one word belonging to each named entity. Therefore, the main task model does not have to be aware of span boundaries of named entities and thus need not generate accurate span information.

The information processor 100 generates an input data set for the span search model 58 based on the output of the main task model. The input data set includes multiple pairs of position information and class information. The position information indicates the position of a word to which a class has been assigned by the main task model. The class information indicates the class assigned by the main task model. The main task model may assign more than one class to the same word. Hence, the input data set may include two or more records with the same position information but different class information. This makes it possible to define complex named entities, such as overlapping and nested named entities.

The information processor 100 extracts one pair of position information and class information from the input data set. The information processor 100 inputs the extracted position information and class information and the text 57 to the span search model 58. The span search model identifies, within the text 57, the word indicated by the position information, estimates the span of a named entity to which the identified word belongs, and outputs span information. The information processor 100 inputs a different pair of position information and class information to the span search model 58 to acquire span information of a different named entity.

Instead of estimating the spans of all named entities contained in the text 57 at once, the span search model 58 estimates the span of a named entity containing a single word of interest one by one. This simplifies the structure of the span search model 58. In addition, the span search model 58 is also able to accurately estimate the spans of complex named entities, such as overlapping and nested named entities.

The information processor 100 combines the output of the main task model and the output of the span search model 58 to generate task results 59. For example, the main task model assigns labels, each including class information but no span information, to words contained in the text 57. The information processor 100 adds the span information output from the span search model 58 to each of the labels output from the main task model to thereby generate the task results 59.

When the main task is named entity recognition, the task results 59 indicate the spans of named entities contained in the text 57 and classes of the named entities. When the main task is relation extraction, the task results indicate the spans of the individual named entities contained in the text 57 and classes representing relationships between multiple named entities. When the main task is semantic role labeling, the task results 59 indicate the spans of the named entities contained in the text 57 and classes representing dependency relations between the named entities and their predicates.

The main task models 51, 52, 53, 54, 55, and 56 and the span search model 58 are generated through machine learning. The information processor 100 is able to generate, from common text to which teacher labels are assigned, both training data for the main task models and training data for the span search model 58. Each of the teacher labels attached to the text indicates the span of a named entity and a class associated with the named entity.

The training data for the main task models includes text as input data while including position information of each word belonging to individual named entities and class information of classes associated with the named entities as teacher data. The training data for the span search model 58 includes text, position information, and class information as input data while including span information indicating the span of each named entity as teacher data.

Figure 7:
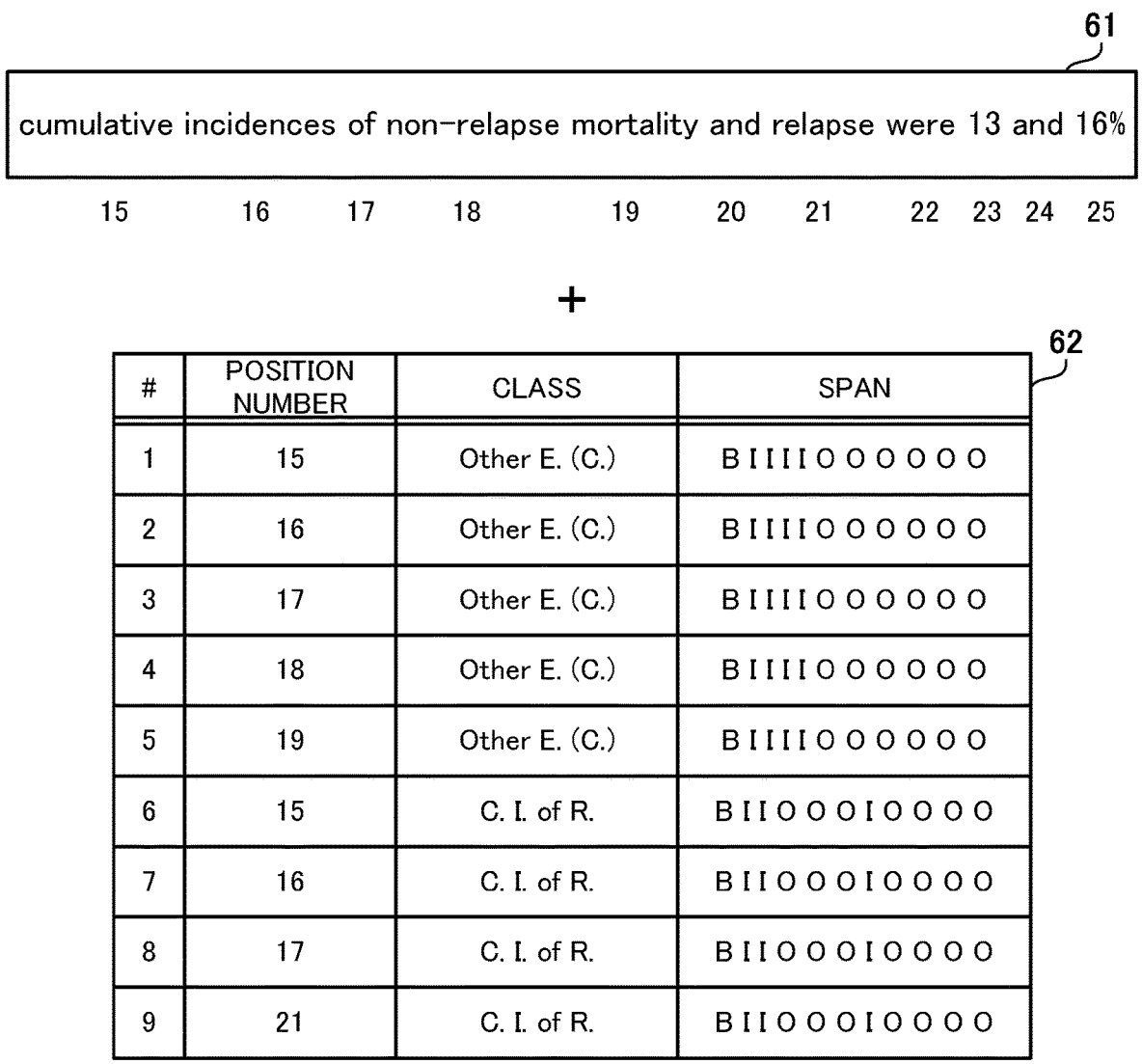
FIG. 7 illustrates an example of training data used to generate the span search model.

FIG. 7 illustrates an example of training data used to generate a span search model. The training data includes text 61. The character string of the text 61 is the same as that of the text 41 of FIG. 5. The information processor 100 divides the character string contained in the text 61 into words, and assigns, as position numbers, ascending natural numbers to the individual words in order from the beginning of the text 61. In the example of FIG. 7, Position #15 is assigned to a word "cumulative"; Position #16 to a word "incidences"; Position #17 to a word "of"; Position #18 to a word "non-relapse"; Position #19 to a word "mortality"; Position #20 to a word "and"; Position #21 to a word "relapse"; Position #22 to a word "were"; Position #23 to a word "13"; Position #24 to a word "and"; and Position #25 to a word "16%".

The training data also includes a table 62. The table 62 includes multiple records, each of which maps a position number, a class, and a span to one another. The position number indicates one word in the text 61. The class is a class of a named entity that contains the word indicated by the corresponding position number. The span indicates whether each word of the text 61 belongs to the corresponding named entity. The span is represented by a symbol string in BIO format. The length of the symbol string corresponds to the number of words contained in the text 61. The word at the beginning of a named entity is represented by "B". Each word contained in the named entity, other than the beginning, is represented by "I". Each word not contained in the named entity is represented by "O".

The text 61 contains the named entity 42 "cumulative incidences of non-relapse mortality", whose class is "Other endpoints (clinical)". Therefore, the table includes a record with a position number of #15, a class of "Other endpoints (clinical)", and a span of "BIIIIOOOOOO". Similarly, the table 62 includes records, each having the same class and span as above and one of the position numbers #16, #17, #18, and #19.

The text 61 also includes the named entity 43 "cumulative incidences of relapse", whose class is "Cumulative incidence of relapse". Therefore, the table 62 includes a record with a position number of #15, a class of "Cumulative incidence of relapse", and a span of "BIIOOOIOOOO". Similarly, the table 62 includes records, each having the same class and span as above and one of the position numbers #16, #17, and #21.

Figure 8:
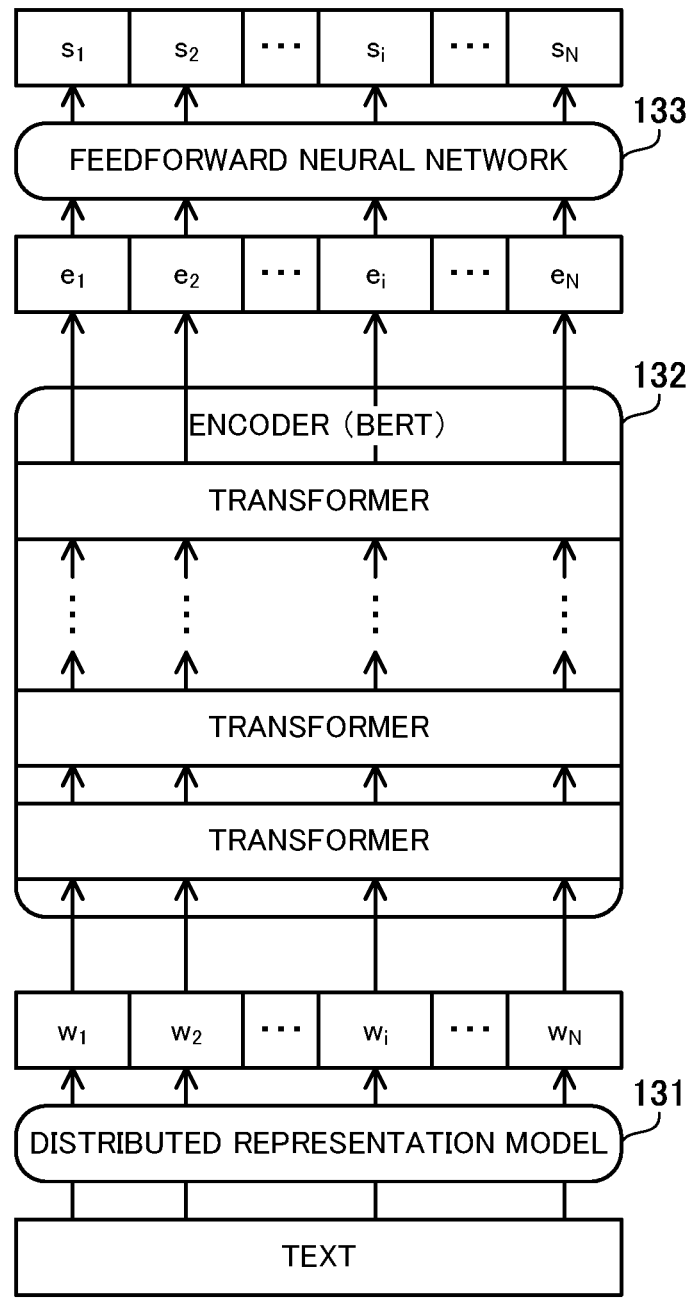
FIG. 8 illustrates an example structure of a named entity recognition model.

Next described are structures of a named entity recognition model and the span search model 58. FIG. 8 illustrates an example structure of the named entity recognition model. The named entity recognition model includes a distributed representation model 131, an encoder 132, and a feedforward neural network 133. The named entity recognition model extracts multiple consecutive words from text. The number N of words extracted at one time is, for example, 128, 256, 512, or the like.

The named entity recognition model inputs each of the multiple words to the distributed representation model to generate word vectors $w_1, w_2, \ldots, w_i, \ldots,$ and $w_N$ in distributed representation, individually corresponding to each of the multiple words. A word vector is a column vector that enumerates multiple numerical values. The number of dimensions of a word vector is, for example, about several hundred dimensions, such as 300 dimensions. The word vectors output from the distributed representation model 131 are word vectors which do not take context into consideration.

The distributed representation model 131 is a neural network generated through machine learning. For example, the distributed representation model 131 receives one-hot vectors, in each of which the numerical value of a dimension corresponding to a word of interest is 1 and the numerical values of other dimensions are all 0s. The distributed representation model 131 converts the one-hot vectors into word vectors with about several hundred dimensions.

The named entity recognition model inputs the word vectors $w_1, w_2, \ldots, w_i, \ldots,$ and $w_N$ to the encoder 132 to generate word vectors $e_1, e_2, \ldots, e_i, \ldots,$ and $e_N$. Unlike the case of the distributed representation model 131, N word vectors are input to the encoder 132 at one time. The word vectors output from the encoder 132 are contextual word vectors. Therefore, different word vectors may be generated from the same word, depending on the preceding and succeeding words. The encoder 132 is a neural network generated through machine learning. The encoder 132 is, for example, bidirectional encoder representations from transformers (BERT). The BERT includes 24 layers of transformers connected in series. Each transformer converts input vectors to different vectors.

The named entity recognition model inputs the word vectors $e_1, e_2, \ldots, e_i, \ldots,$ and $e_N$ to the feedforward neural network 133 to generate tag scores $s_1, s_2, \ldots, s_i, \ldots,$ and $s_N$. N word vectors are input to the feedforward neural network 133 at one time. That is, the input of the feedforward neural network 133 is a concatenated vector formed by connecting the word vectors $e_1, e_2, \ldots, e_i, \ldots,$ and $e_N$. The feedforward neural network 133 is a forward-direction neural network including no feedback path.

A tag score corresponding to a given word includes multiple non-negative integers corresponding to multiple classes. The numerical value of a class indicates the probability of the word belonging to the class. A commonly used named entity recognition model determines the class and span of each named entity to maximize overall probabilities based on the tag scores $s_1, s_2, \ldots, s_i, \ldots,$ and $s_N$.

On the other hand, the named entity recognition model described here need not determine the spans of named entities. The named entity recognition model may assign two or more classes to the same word. For example, for each of multiple words, the named entity recognition model selects, from the corresponding tag score, all classes whose probabilities exceed a threshold, and assigns the selected classes to the word. In this manner, the named entity recognition model is able to also recognize classes of overlapping and nested named entities.

Figure 9:
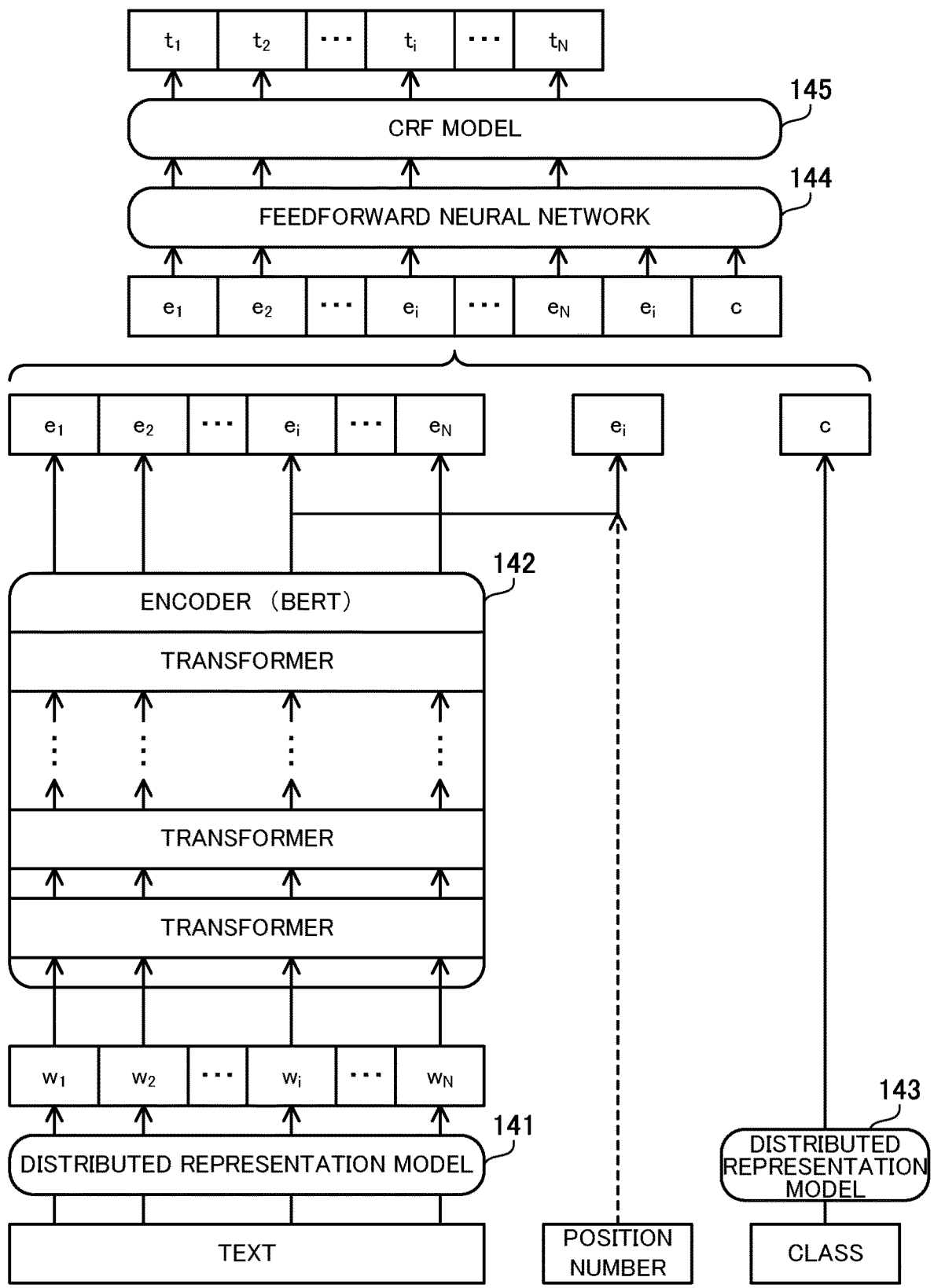
FIG. 9 illustrates an example structure of the span search model.

FIG. 9 illustrates an example structure of a span search model. The span search model 58 includes a distributed representation model 141, an encoder 142, a distributed representation model 143, a feedforward neural network 144, and a conditional random field (CRF) model 145. The span search model 58 extracts multiple consecutive words from text. The number N of words extracted at one time is the same as in the named entity recognition model described above.

The span search model 58 inputs each of the multiple words to the distributed representation model 141 to generate word vectors $w_1, w_2, \ldots, w_i, \ldots,$ and $w_N$ in distributed representation, individually corresponding to each of the multiple words. The distributed representation model 141 may be the same as the distributed representation model 131. The span search model 58 inputs the word vectors $w_1, w_2, \ldots, w_i, \ldots,$ and $w_N$ to the encoder 142 to generate word vectors $e_1, e_2, \ldots, e_i, \ldots,$ and $e_N$. The encoder 142 is, for example, a BERT. The encoder 142 may be the same as the encoder 132.

The span search model 58 selects, amongst the word vectors $e_1, e_2, \ldots, e_i, \ldots,$ and $e_N$, the word vector $e_i$ corresponding to a specified position number #i. The word vector $e_i$ is the word vector of the i-th word. The span search model 58 also inputs a specified class to the distributed representation model 143 to generate a class vector c in distributed representation. The class vector c is a column vector that enumerates multiple numerical values. The number of dimensions of the class vector c is, for example, about several hundred dimensions, such as 300 dimensions. The class vector c may have the same number of dimensions as the word vectors $e_1, e_2, \ldots, e_i, \ldots,$ and $e_N$.

The distributed representation model 143 is a neural network generated through machine learning. For example, the distributed representation model 143 receives a one-hot vector having 1 for the numerical value of the dimension corresponding to the specified class and 0s for the numerical values of other dimensions. The distributed representation model 143 converts the one-hot vector into the class vector c with about several hundred dimensions. The distributed representation model 143 may have the same structure as the distributed representation model 141.

The span search model 58 inputs the word vectors $e_1, e_2, \ldots, e_i, \ldots,$ and $e_N$, the word vector $e_i$, and the class vector c to the feedforward neural network 144. The feedforward neural network 144 receives N+2 vectors simultaneously. That is, the input of the feedforward neural network 144 is a concatenated vector formed by connecting the word vectors $e_1, e_2, \ldots, e_i, \ldots,$ and $e_N$, the word vector $e_i$, and the class vector c. The feedforward neural network 144 is a forward-direction neural network including no feedback path.

The feedforward neural network 144 generates N tag scores corresponding to the N words. A tag score corresponding to a given word includes multiple non-negative integers corresponding to multiple span tags. The multiple span tags are B, I, and O. The numerical value of a span tag indicates the probability of the span tag to be given to the word.

The span search model 58 inputs the N tag scores to the CRF model 145 to generate span tags $t_1, t_2, \ldots, t_i, \ldots,$ and $t_N$ corresponding to the N words. The CRF model is a neural network. There is a constraint that a span tag sequence contains only one "B" and no "I" appears before the "B". However, "O" may exist between "B" and "I", and "O" may exist between "I" and "I". That is, two or more words included in a named entity may be discontinuous. Based on the tag scores of the N words, the CRF model 145 searches for the combination of the span tags $t_1, t_2, \ldots, t_i, \ldots,$ and $t_N$ that maximizes the probabilities while satisfying the constraint.

Figure 10:
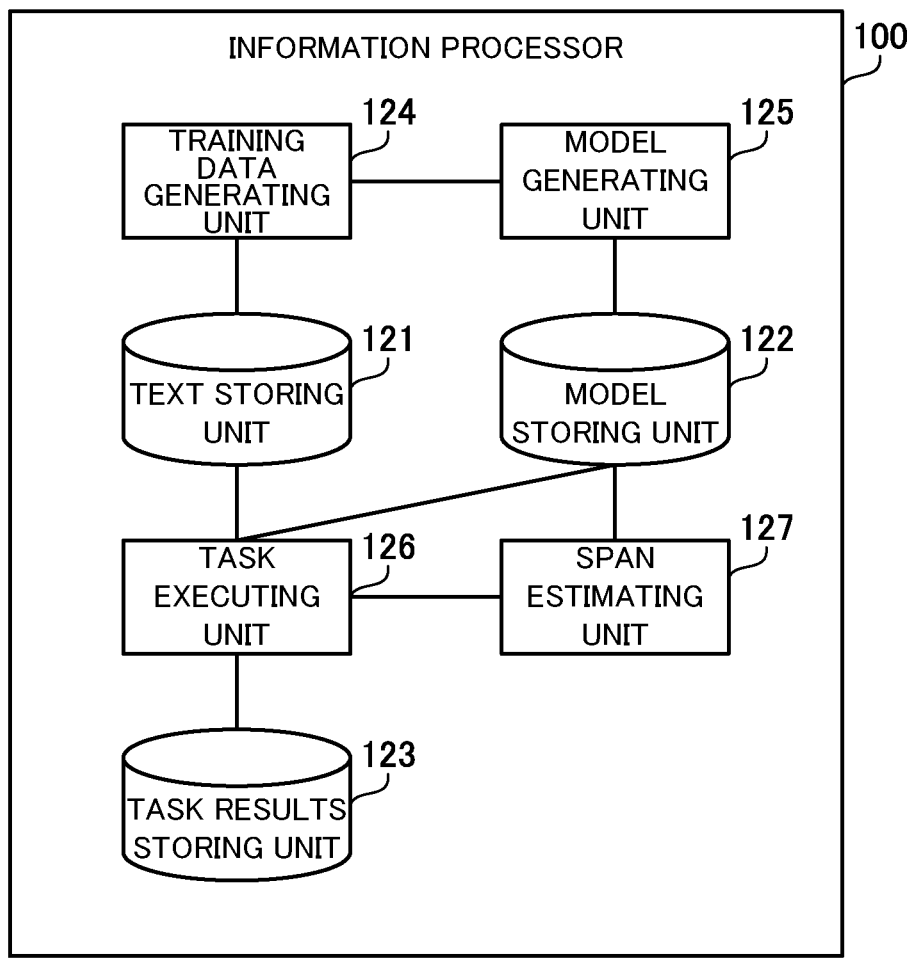
FIG. 10 is a block diagram illustrating an example of functions of the information processor.

Next described are functions and processing procedures of the information processor 100. FIG. 10 is a block diagram illustrating an example of functions of an information processor. The information processor 100 includes a text storing unit 121, a model storing unit 122, a task results storing unit 123, a training data generating unit 124, a model generating unit 125, a task executing unit 126, and a span estimating unit 127.

The text storing unit 121, the model storing unit 122, and the task results storing unit 123 are implemented using a storage area secured, for example, in the RAM 102 or the HDD 103. The training data generating unit 124, the model generating unit 125, the task executing unit 126, and the span estimating unit 127 are implemented using, for example, programs executed by the CPU 101.

The text storing unit 121 stores therein text written in natural language. The text storing unit 121 stores text for machine learning, to which teacher labels are assigned. The text storing unit 121 also stores text to be analyzed (hereinafter simply called analysis text), with no teacher labels assigned thereto.

The model storing unit 122 stores a main task model and a span search model. The model storing unit 122 may store multiple types of main task models. The main task model may be generated by the information processor 100 or a different information processor. The span search model is generated by the information processor 100.

The task results storing unit 123 stores therein task results indicating results of a natural language processing task performed on the analysis text. The task results are, for example, results of named entity recognition, relation extraction, or semantic role labeling. The task results include labels associated with words of the text. Each label includes class information and span information.

The training data generating unit 124 generates machine learning training data for the span search model. The training data generating unit 124 reads out the teacher-labeled text from the text storing unit 121. The training data generating unit 124 extracts words belonging to named entities from the teacher-labeled text, and exhaustively generates pairs of the position number of a word and the class associated with a named entity. In addition, the training data generating unit 124 generates BIO representations, which are the spans of named entities. The training data generating unit 124 generates training data including the text, position numbers, classes, and spans.

The model generating unit 125 executes machine learning of the span search model using the training data generated by the training data generating unit 124. For example, the model generating unit 125 optimizes weights of edges included in the neural network by error backpropagation. The model generating unit 125 inputs the text, a position number, and a class included in the training data to the span search model. The model generating unit calculates the error between an estimated span output from the span search model and the correct span included in the training data, and updates the parameter values so as to reduce the error. The model generating unit 125 stores the generated span search model in the model storing unit 122.

The task executing unit 126 reads the analysis text from the text storing unit 121. The task executing unit 126 also reads the main task model from the model storing unit 122. The analysis text and the main task are specified by the user. The task executing unit 126 inputs the text to the main task model, and passes the text and the output of the main task model to the span estimating unit 127. The task executing unit 126 acquires span information from the span estimating unit 127 and combines the output of the main task model and the span information to generate task results.

The task executing unit 126 outputs the task results. For example, the task executing unit 126 stores the task results in the task results storing unit 123; displays the task results on the display device 111; and/or transmits the task results to a different information processor.

The span estimating unit 127 reads the span search model from the model storing unit 122. The span estimating unit 127 generates an input data set including text, position numbers, and classes. The span estimating unit 127 inputs, in addition to the text, each pair of a position number and a class one by one to the span search model, and generates span information of a named entity including a word indicated by the position number. The span estimating unit 127 passes a set of span information thus generated to the task executing unit 126.

Figure 11:
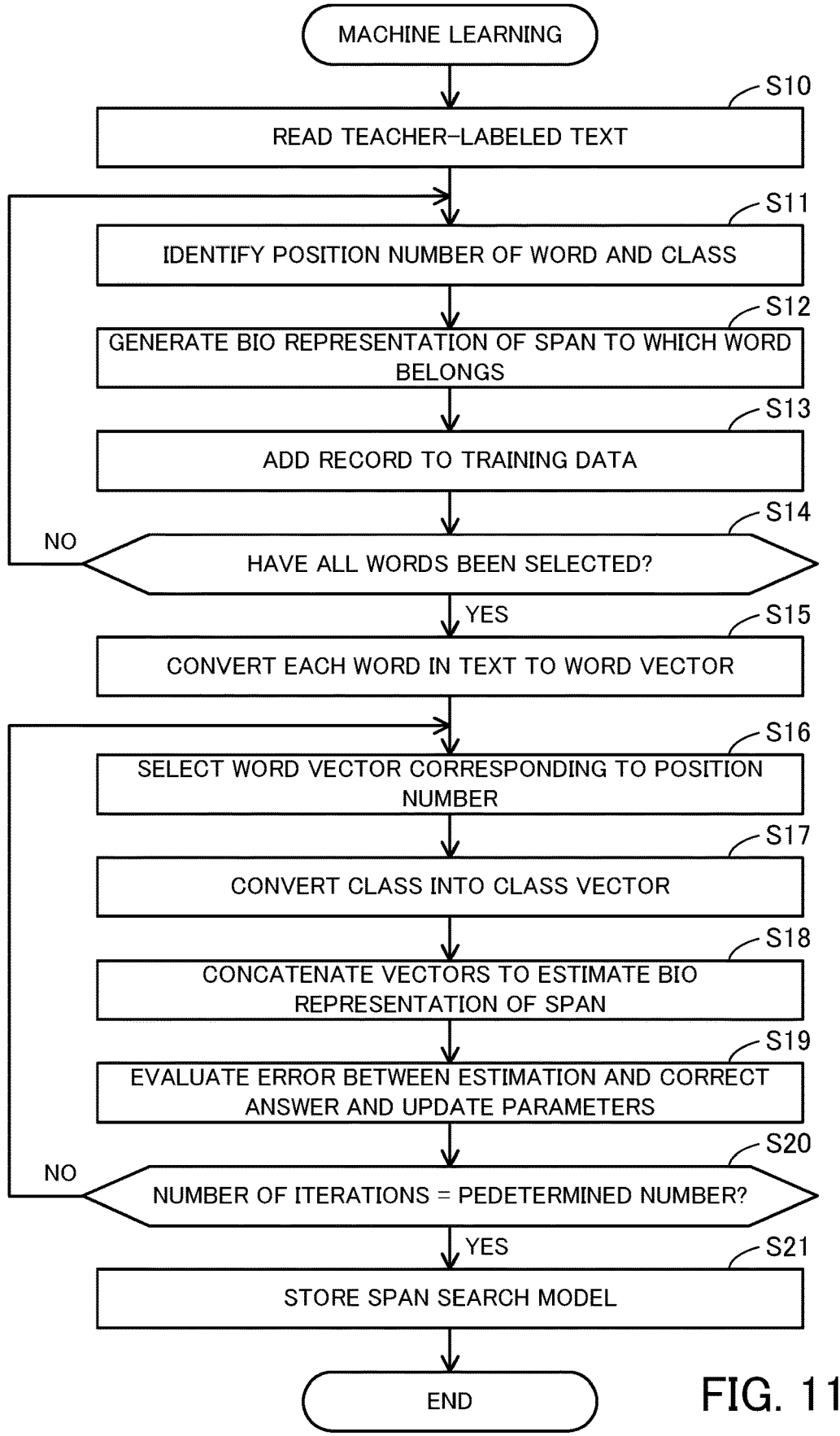
FIG. 11 is a flowchart illustrating an example of a machine learning procedure.

FIG. 11 is a flowchart illustrating an example of a machine learning procedure. The training data generating unit 124 reads text with teacher labels (hereinafter simply called teacher-labeled text) which indicate the spans of named entities and classes assigned to the named entities (step S10). The training data generating unit 124 selects, from the teacher-labeled text, one word included in a named entity. The training data generating unit 124 calculates a position number that indicates the position of the selected word in the text. The training data generating unit 124 also identifies a class associated with the named entity to which the selected word belongs (step S11).

The training data generating unit 124 generates a BIO representation of the span of the named entity to which the selected word belongs. The BIO representation of the span has a length corresponding to the number of words contained in the text. A word at the beginning of the span is represented by "B", each word included in the span other than the beginning is represented by "I", and each word not included in the span is represented by "O" (step S12). The training data generating unit 124 adds, to training data, a record including the position number and class of step S11 and the BIO representation of the span of step S12 (step S13).

The training data generating unit 124 determines whether all words belonging to the named entities have been selected from the teacher-labeled text. If all the words have been selected, the process moves to step S15; otherwise, the process returns to step S11 (step S14).

The model generating unit 125 converts each of the multiple words contained in the text into a word vector in distributed representation. The word vectors generated here are preferably those taking context into consideration (step S15). The model generating unit 125 selects one record from the training data. The model generating unit 125 selects, amongst the multiple word vectors of step S15, one word vector corresponding to the position number included in the selected record (step S16).

The model generating unit 125 converts the class included in the selected record to a class vector in distributed representation (step S17). The model generating unit 125 concatenates the multiple word vectors generated in step S15, the word vector selected in step S16, and the class vector generated in step S17 to generate a concatenated vector. The model generating unit 125 estimates a BIO representation of the span from the concatenated vector (step S18).

The model generating unit 125 evaluates the error between the estimated span of step S18 and the correct span included in the selected record. The model generating unit updates parameter values of the span search model to reduce the error (step S19). The model generating unit 125 determines whether the number of iterations of steps S16 to S19 has reached a predetermined number. If the number of iterations has reached the predetermined number, the process moves to step S21; otherwise, the process returns to step S16 (step S20). The model generating unit 125 stores the span search model (step S21).

Figure 12:
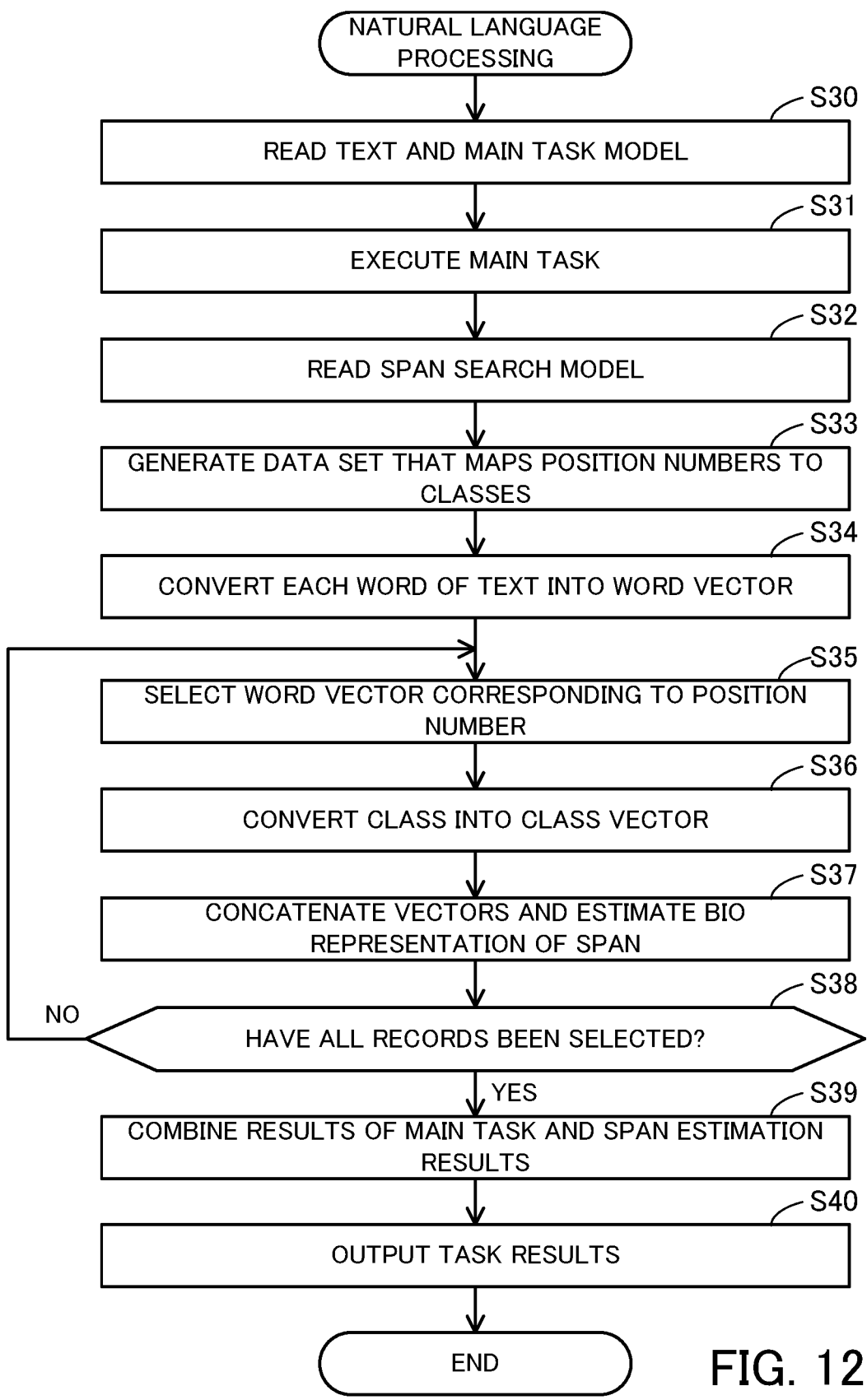
FIG. 12 is a flowchart illustrating an example of a natural language processing procedure.

FIG. 12 is a flowchart illustrating an example of a natural language processing procedure. The task executing unit 126 reads the analysis text and the main task model (step S30). The task executing unit 126 inputs the text to the main task model and executes a main task. In this connection, span information of named entities may be omitted from the output of the main task model (step S31).

The span estimating unit 127 reads the span search model (step S32). The span estimating unit 127 generates, from the output of the main task model obtained in step S31, a data set that maps position numbers indicating positions of words to classes assigned to the words. Specifically, the data set includes multiple records with different combinations of a position number and a class (step S33).

The span estimating unit 127 converts each of multiple words contained in the text into word vectors in distributed representation. The word vectors generated here are preferably those taking context into consideration (step S34). The span estimating unit 127 selects one record from the data set. The span estimating unit 127 selects, amongst the multiple word vectors of step S34, one word vector corresponding to the position number included in the selected record (step S35).

The span estimating unit 127 converts the class included in the selected record into a class vector in distributed representation (step S36). The span estimating unit 127 concatenates the multiple word vectors generated in step S34, the word vector selected in step S35, and the class vector generated in step S36 to generate a concatenated vector. The span estimating unit 127 estimates a BIO representation of the span from the concatenated vector (step S37).

The span estimating unit 127 determines whether all records have been selected from the data set. If all the records have been selected, the process moves to step S39; otherwise, the process returns to step S35 (step S38). The task executing unit 126 combines the output of the main task model and the BIO representation of the span estimated in step S37 (step S39).

Assume, for example, that a word is labeled as "class X" by the main task model and labeled as "I" by the span search model. In this case, the task executing unit combines the two labels to generate a label with "I-class X". Assume also that a word preceding the word of "I-class X" is not labeled by the main task model but labeled as "B" by the span search model. In that case, the task executing unit 126 gives a label of "B-class X" to the word. Thus, the task executing unit 126 complements the output of the main task model, which does not represent an accurate span, with information of the span estimated by the span search model.

The task executing unit 126 outputs the task results combined in step S39. The task executing unit 126, for example, stores the task results in the task results storing unit 123; displays the task results on the display device 111; and/or transmits the task results to a different information processor (step S40).

As has been described above, the information processor 100 of the third embodiment generates, through machine learning, a span search model that estimates the span of a named entity to which a given word belongs from text, the position number of the word, and the class mapped to the word. Then, the information processor 100 connects the span search model to the back of the main task model to estimate the spans of named entities. The use of the span search model separated from various main task models allows the information processor 100 to accurately estimate the spans of named entities.

The information processor 100 is able to use text of various tasks and domains as training data for machine learning of the span search model. This allows the information processor 100 to increase the amount of training data and thus improve the accuracy of the span search model. For example, the information processor 100 is able to improve the accuracy of the span search model using both text in the medical field and text in the political economy field.

In addition, the information processor 100 is able to improve the accuracy of span estimation without being affected by the accuracy of a main task, such as named entity recognition, relation extraction, or semantic role labeling. In addition, it is possible to prevent loss of accuracy of the main task due to the accuracy of span estimation. Separating the span estimation from various main task models also facilitates implementation of the main task models and improves the accuracy of the main tasks themselves. In particular, because the span estimation is performed subsequently, the main task models need not be aware of boundaries of the spans of named entities.

The span search model also estimates, for one word of interest, the span of a named entity including the word. Herewith, the span search model is able to accurately estimate the spans of complex named entities, such as discontinuous named entities, overlapping named entities, and nested named entities in text. The above-described span estimation of the span search model allows simplification of the structure of the span search model.

According to one aspect, it is possible to improve recognition accuracy for the ranges of named entities.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein a computer program that causes a computer to execute a process comprising:

acquiring training data that includes first text including a plurality of first words, first class information indicating a class mapped to a first word of the plurality of first words, first position information indicating a position of the first word in the first text, and first range information indicating a range of a first named entity that includes the first word in the first text; and executing, based on the training data, machine learning of a machine learning model used to estimate, from text, class information, and position information, range information of a named entity contained in the text, the machine learning model being a neural network that transforms a plurality of words included in the text into a plurality of word vectors, transforms the class information into a class vector concatenates the plurality of word vectors, the class vector and a word vector of a word indicated by the position information amongst the plurality of word vectors to generate a concatenated vector, and transforms the concatenated vector into the range information.

2. The non-transitory computer-readable recording medium according to claim 1, wherein:

the first class information indicates a class assigned to the first word based on the first text by another machine learning model different from the machine learning model.

3. The non-transitory computer-readable recording medium according to claim 1, wherein:
the first range information is a code string indicating whether each of the plurality of first words contained in the first text belongs to the range of the first named entity.

4. A machine learning method comprising:
acquiring, by a processor, training data that includes first text including a plurality of first words, first class information indicating a class mapped to a first word of the plurality of first words, first position information indicating a position of the first word in the first text, and first range information indicating a range of a first named entity that includes the first word in the first text; and
executing, by the processor, based on the training data, machine learning of a machine learning model used to estimate, from text, class information, and position information, range information of a named entity contained in the text, the machine learning model being a neural network that transforms a plurality of words included in the text into a plurality of word vectors, transforms the class information into a class vector, concatenates the plurality of word vectors, the class vector and a word vector of a word indicated by the position information amongst the plurality of word vectors to generate a concatenated vector, and transforms the concatenated vector into the range information.

5. A natural language processing apparatus comprising:
a memory configured to store text including a plurality of words and a machine learning model; and
a processor coupled to the memory and the processor configured to:
generate input data that includes the text, class information indicating a class mapped to a word of the plurality of words, and position information indicating a position of the word in the text, and
generate, by inputting the input data to the machine learning model, range information indicating a range of a named entity that includes the word in the text, the machine learning model being a neural network that transforms the plurality of words into a plurality of word vectors, transforms the class information into a class vector, concatenates the plurality of word vectors, the class vector and a word vector of the word amongst the plurality of word vectors to generate a concatenated vector, and transforms the concatenated vector into the range information.

6. The natural language processing apparatus according to claim 5, wherein:
the processor is further configured to:
generate the class information and the position information by inputting the text to another machine learning model different from the machine learning model, and
combine the range information and an output of the other machine learning model.

* * * * *